United States Patent [19]

Mozzhukhin et al.

[11] 4,144,432
[45] Mar. 13, 1979

[54] APPARATUS FOR SURFACING VALVES FOR INTERNAL COMBUSTION ENGINES

[76] Inventors: Anatoly A. Mozzhukhin, ulitsa Pochaininskaya, 23, kv. 43; Daniil A. Dudko, ulitsa Anri Barbjusa, 22/26, kv. 143; Vladimir P. Sotchenko, ulitsa P. Tychiny, 13, kv. 210; Boleslav I. Maximovich, ulitsa Anri Barbjusa, 22/26, kv. 107, all of, Kiev, U.S.S.R.

[21] Appl. No.: 791,007

[22] Filed: Apr. 26, 1977

[51] Int. Cl.² .................. H05B 5/00; B23K 13/00
[52] U.S. Cl. ................................. 219/9.5; 29/49; 219/10.57; 219/10.69; 219/85 A; 219/157; 228/49 A
[58] Field of Search ............... 219/9.5, 10.41, 10.43, 219/10.57, 10.53, 10.67, 10.69, 10.73, 10.75, 85 A, 85 G, 158, 159, 161; 228/47, 49 A, 6 R, 107, 212; 29/785, 786, 792, 793, 809, 33 K, 33 P; 51/215 R, 215 HK; 427/45

[56] References Cited
U.S. PATENT DOCUMENTS

| 2,792,212 | 5/1957 | Kirby et al. | 219/10.69 |
| 3,504,148 | 3/1970 | Maximovich et al. | 219/10.41 |
| 3,507,030 | 4/1970 | Kelly | 29/809 |
| 3,705,679 | 12/1972 | Tenpas | 228/49 A |
| 3,942,703 | 3/1976 | Plegat | 228/47 |

*Primary Examiner*—Bruce A. Reynolds
*Attorney, Agent, or Firm*—Fleit & Jacobson

[57] ABSTRACT

Surfacing is realized by fusing refractory alloy rings on the effective areas of valves. The apparatus comprises: a heater, a valve clamping device and a manipulator adapted to receive and to convey a valve with a ring on the stem thereof to the heater zone simultaneously positioning said valve head downwards. The manipulator is operatively connected to a platform on which a feed mechanism adapted to feed the valve to the heater and to the valve clamping device, a sprayer and an unloading chute are mounted. According to the motion of the manipulator the platform alternately positions under the heater the operating mechanisms mounted thereon.

5 Claims, 8 Drawing Figures

APPARATUS FOR SURFACING VALVES FOR INTERNAL COMBUSTION ENGINES

BACKGROUND OF THE INVENTION

The present invention relates to surfacing apparatus, and more particularly, to apparatus for applying a refractory alloy coating to the effective areas of valves for internal combustion engines.

The term "effective area" is used to denote a chamfer made in the head of the internal combustion engine valve and meant for providing a tight fit between the valve and the corresponding seat chamfer.

It is known that the effective areas of internal combustion engine valves are exposed to repeated contact loads and to the action of high temperatures reaching 800°–1000° C. In order to extend the service life of the valves the effective area thereof is coated with refractory alloys.

At present for surfacing the effective areas of internal combustion engine valves use is made of flame, plasma or high frequency operating mechanisms, respectively, which melt the refractory alloy to be applied to the effective area. A possibility of automation and simplicity of the process of surfacing the valve effective areas in the high frequency current field advantageously distinguish apparatus with a high frequency operating mechanism from other known apparatus.

There are known apparatus for surfacing the effective areas of valves, wherein assembly of a valve, i.e. placing of a refractory alloy ring on the head of the valve, and positioning of said valve into the surfacing zone is carried out manually. However, these auxiliary operations consume much time and labour, thereby causing low efficiency of such apparatus.

There are also known apparatus for surfacing valves for internal combustion engines by fusing on the effective areas of the valves refractory alloy rings, in which apparatus a valve is assembled with a ring and positioned in the surfacing zone automatically.

However, successive disposition of stationary operating mechanisms, either directly participating in the process of surfacing, i.e., the heater, or auxiliary ones, e.g., means for loading and unloading the valves, requires a drive rotor of a complex design. This drive rotor should provide conveyance of a valve to a corresponding operating station, bringing of the valve to an operating mechanism, if necessary, with a time lag for treatment, and withdrawal of the valve from said operating mechanism. The foregoing features reveal the complexity of the apparatus of this type, low reliability and difficulty of control thereof. Besides, the construction of said apparatus excludes any possibility to carry out the operations, e.g., loading and unloading, at one operating station which, naturally, causes insufficient production rate.

The object of the present invention is generally to provide an apparatus for surfacing valves for internal combustion engines by fusing refractory alloy rings on the effective areas of the valves, said apparatus featuring a simple construction.

A further object of the present invention is to provide an apparatus for surfacing valves for internal combustion engines which is simple in control and maintenance.

Another object of the present invention is to provide an apparatus for surfacing valves for internal combustion engines which is fail-safe in operation.

Still another object of the present invention is to provide an apparatus for surfacing valves, wherein feeding of a valve to a heater and to a valve clamping device, cooling of the valve being surfaced and unloading of the same are carried out at one station.

In accordance with the foregoing and other objects the invention resides in that the apparatus for surfacing valves for internal combustion engines by fusing refractory alloy rings on the effective areas of the valves comprises: a heater, a valve clamping device containing a rotation gear, a manipulator adapted to receive and to convey said valve to the heater zone simultaneously positioning said valve head downwards, a feed mechanism adapted to feed said valve to the heater and to the valve clamping device, a sprayer and an unloading chute; according to the invention said valve feed mechanism, said sprayer and said unloading chute are mounted on a platform operatively connected through a transfer gear to the manipulator to provide alternate positioning under the heater of the feed mechanism, of the sprayer and of the unloading chute.

It is preferred to mount the platform on a shaft for rotation in the horizontal plane.

To make the structure of the apparatus more simplified it is expedient that the transfer gear operatively connecting the platform to the manipulator should be formed by a toothed sector fixed on the drive shaft of the manipulator and by a toothed sector mounted on the periphery of the platform which is in meshing engagement with said toothed sector of the drive shaft.

The sprayer may be made annular and mounted at the inlet end of the unloading chute thereby preventing blocking up of the holes of the sprayer with melted metal of the fused ring and making the structure of the apparatus more simplified.

Thus, mounting of the sprayer, of the valve feed mechanism and of the unloading chute on the common platform which is operatively connected to the manipulator ensures, according to the movement of the latter, alternate positioning under the heater of said operating mechanisms, which, in turn, makes it possible to carry out at one operating station both operations, that is, surfacing and cooling, and auxiliary operations, i.e. loading and unloading.

The foregoing and other objects and advantages of the invention will become apparent from consideration of the detailed description of an embodiment thereof in conjunction with the accompanying drawings wherein.

DESCRIPTION OF THE PREFERRED EMBODIMENT OF THE INVENTION

Figure 1:
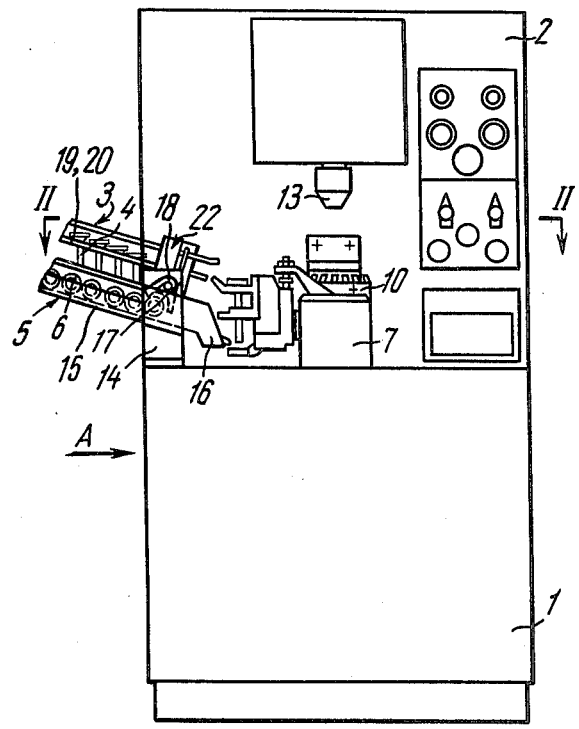
FIG. 1 is a diagrammatic representation of the apparatus for surfacing effective areas of valves for internal combustion engines constructed in accordance with the invention, general view.

The apparatus for surfacing the effective areas of valves for internal combustion engines, as shown in FIG. 1, comprises a frame consisting of a unit 1 and a unit 2.

The unit 1 comprises a feed mechanism 3 adapted to feed valves 4, a feed mechanism 5 adapted to feed rings 6 to be fused on the effective areas of the valves, and a manipulator 7 (FIGS. 1 and 2) adapted to receive the valves 4 and the rings 6, to assemble them and to convey them to the surfacing zone. According to the invention a platform 8 (FIGS. 2 and 3) is mounted inside the unit 1, said platform carrying a valve feed mechanism 9, a sprayer 10 and an unloading chute 11.

Figure 3:
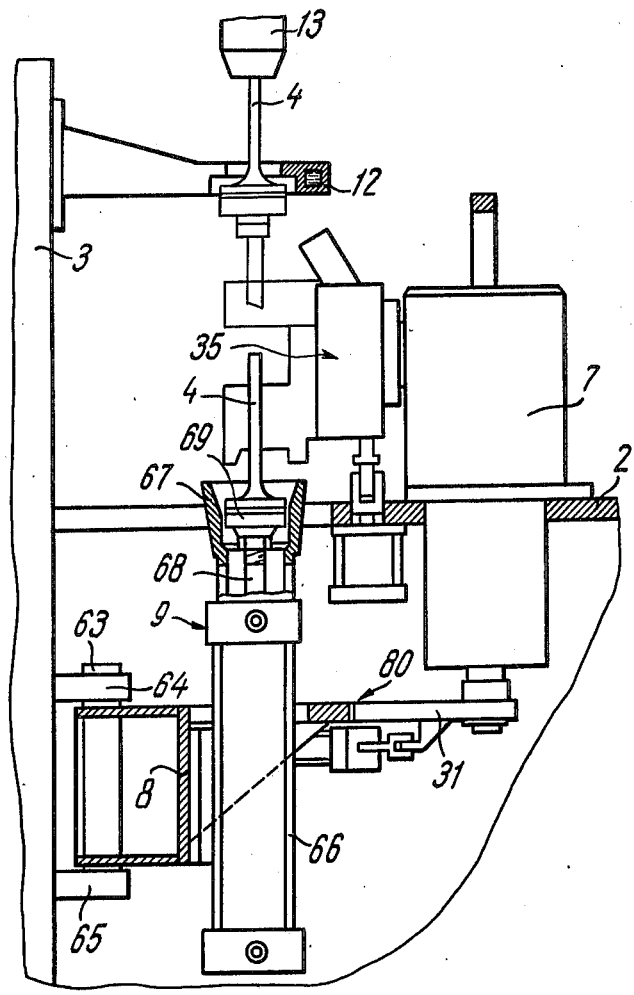
FIG. 3 is a sectional view in the direction of the arrow A in FIG. 1, units of the frame being partially omitted.

In the unit 2, as shown in FIG. 3, a heater is mounted, said heater being a high frequency inductor 12 which is supplied with current of suitable frequency depending on the size of valves, e.g., within the range of 2400–8000 cycles per second. In the same unit a clamping device is mounted comprising drives (not shown) for clamping and rotating the valve 4, said clamping device being a chuck 13 adapted to grip the valve 4 by the end of the stem thereof and to rotate said valve about its axis.

The feed mechanism 5 adapted to feed the rings 6 (FIG. 1 and 2) to be fused on the valves 4 is mounted on a bracket 14 (FIG. 1) and comprises a sloping conveyor chute 15 which is rectangular in cross-section in order to provide rolling motion of the rings 6 in the upright position. Across the conveyor chute 15 a sloping trough 16 (FIG. 2) is mounted, said trough providing sliding motion of the ring 6 on the lateral surface thereof, substantially in the horizontal position.

On the conveyor chute 15 there is mounted a device 17 (FIGS. 1 and 2) adapted to deliver the rings one at a time, which device does not come within the scope of the present invention and, to save space both in the drawings and in the description, is shown diagrammatically; when utilizing the apparatus according to the invention, those skilled in the art may choose any of the known interrupters comprising a pivoted rocker arm 18.

The valve feed mechanism 3 is mounted on a bracket and comprises guides formed by two parallel bars or plates 19 and 20 (FIGS. 1 and 2) on which the head of the valve 4 rests when said valve is conveyed with its stem downwards. A device 22 adapted to deliver the valves one at a time is mounted on a bracket 21 (FIG. 2), said device being shown diagrammatically for the same reason as the device for delivering the rings.

Figure 4:
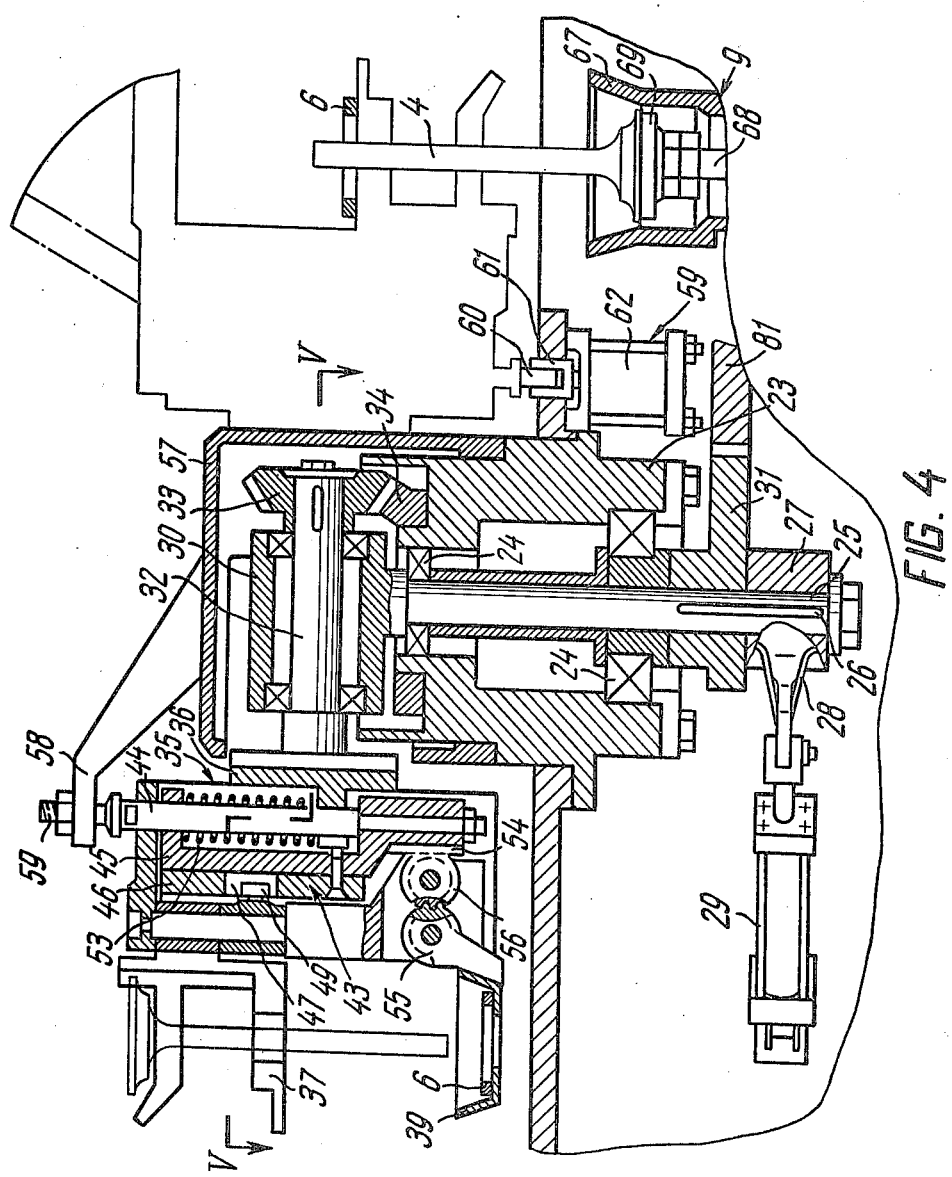
FIG. 4 is a sectional view taken along the line IV—IV in FIG. 2 showing the longitudinal section of a manipulator with an actuator.

The above manipulator 7, as shown in FIG. 4, comprises built into the unit 1 a cylindrical housing 23 wherein in bearings 24 there is placed a vertical drive shaft 25 with a bushing 27 fixed thereto by a key 26, a carrier 28 being rigidly mounted on said bushing. The carrier 28 is linked to a rod of an air cylinder 29 which provides rotation of the shaft 25 by 90°.

Figure 5:
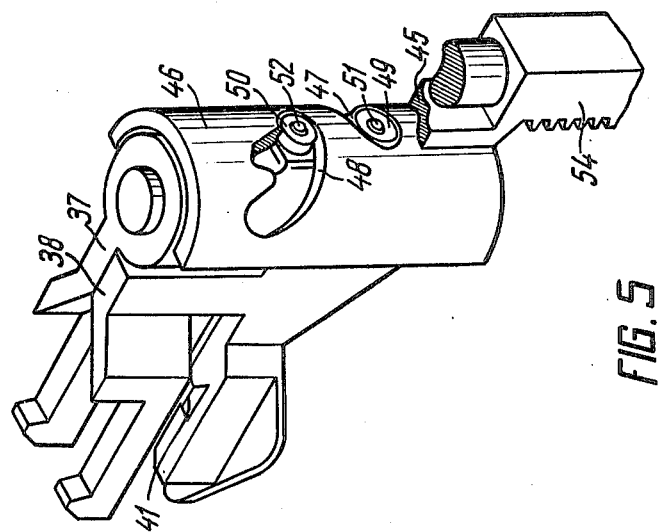
FIG. 5 shows a scaled up axonometrical view of a clamp release mechanism.
Figure 6:
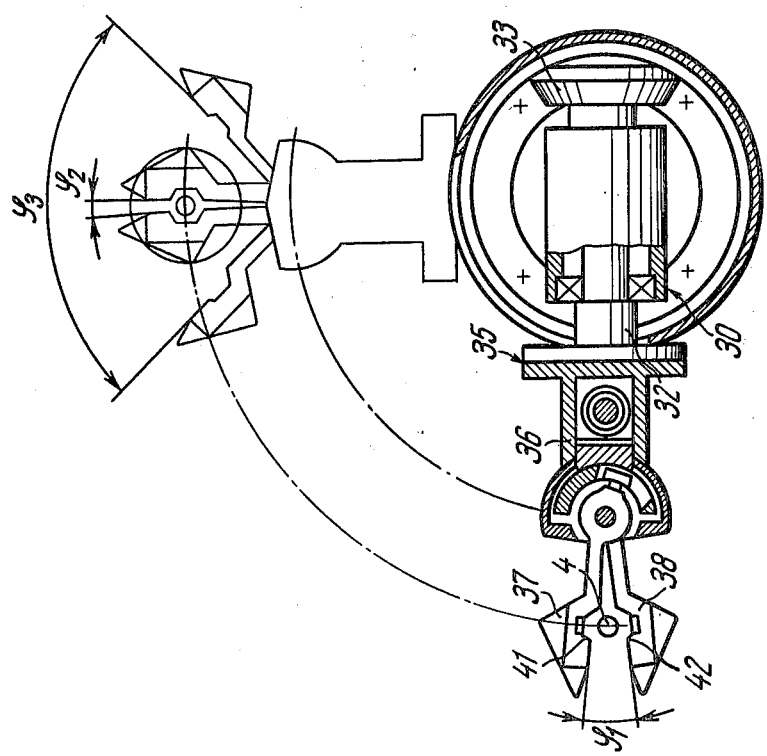
FIG. 6 is a sectional view taken along the line VI—VI in FIG. 4 showing the position of clamps in the valve reception zone and in the valve surfacing zone.

At the upper end of the vertical shaft 25 a bearing assembly 30 is mounted, and at the lower one — a toothed sector 31 (FIGS. 3 and 4). The bearing assembly 30 carries a horizontal shaft 32 (FIG. 4). A bevel pinion 33 is fixed at one end of the horizontal shaft 32 of the manipulator 7, said pinion 33 meshing with a stationary bevel toothed sector 34. At the other end of the horizontal shaft 32 an actuator 35 is mounted; pivoted on the housing 36 of said actuator are clamps 37 and 38 (FIGS. 4 and 5) adapted to clamp the valve 4, and a support 39 rotatable in the vertical plane and adapted to receive the ring 6 and to drop said ring on the stem of the valve 4. As shown in FIGS. 5 and 6, on the internal surface of each clamp 37 and 38 there are grooves 41 and 42, respectively. The grooves are disposed opposite each other, and on closing the clamps 37 and 38 they form a space for the stem of the valve 4 to be positioned and clamped therein.

In the housing 36 of the actuator 35 there is mounted a mechanism 43 (FIG. 4) adapted to release the clamps 37 and 38, said mechanism comprising a rod 44 mounted in the guiding apertures of the housing 36 so that one end thereof extends beyond the housing. A shoe 45 is rigidly secured to the rod 44. A semi-cylindrical casing 46 (FIGS. 4 and 5) is fixed to the shoe 45, said casing having helical grooves 47 and 48 (FIG. 5) extending in opposite directions and adapted to accommodate rollers 49 and 50, which rollers are seated on arms 51 and 52, respectively, of the clamps 37 and 38. The rod 44 has a pressure spring 53 slipped over it, one end of said spring resting on the shoe 45 and the other end — on the housing 36 (FIG. 4).

The support 39 is operatively connected to the mechanism 43 adapted to release the clamps 37 and 38. Said operative connection is formed by a toothed rack 54 secured to the shoe 45, by a toothed sector 55 fixed on the support 39, and by an idle pinion 56 which is in meshing engagement with the toothed rack 54 and the toothed sector 55.

A stationary stop 58 is mounted on the cover 57 of the housing 23 of the manipulator 7, and a movable stop 59 is mounted on the unit 1.

The movable stop 59 is made in the form of a roller 60 mounted on the rod 61 of a fluid cylinder 62.

According to the invention a vertical shaft 63, journalled at 64 and 65, carries the platform 8 (FIGS. 2, 3) which is rotatable in the horizontal plane.

Mounted on the platform 8 is a valve feed mechanism 9 adapted to feed the valves to the inductor 12 and to the chuck 13, which mechanism is a fluid cylinder 66 having a tapered cup 67 mounted on the housing thereof and a pad 69 mounted on its rod 68.

As it was mentioned hereinabove, the unloading chute 11 (FIG. 7) is also mounted on the rotating platform 8, said chute being in the form of a bent pipe 70 having a vertical and inclined thereto runs. At the inlet end of the unloading chute 11, i.e. at the top of the vertical run thereof, the annular sprayer 10 is mounted made in the form of a hollow annulus 71 having a plurality of ports or tubes 72 on the upper side thereof. The cavity of the annulus 71 communicates with a coolant source 73.

Figures 7, 8:
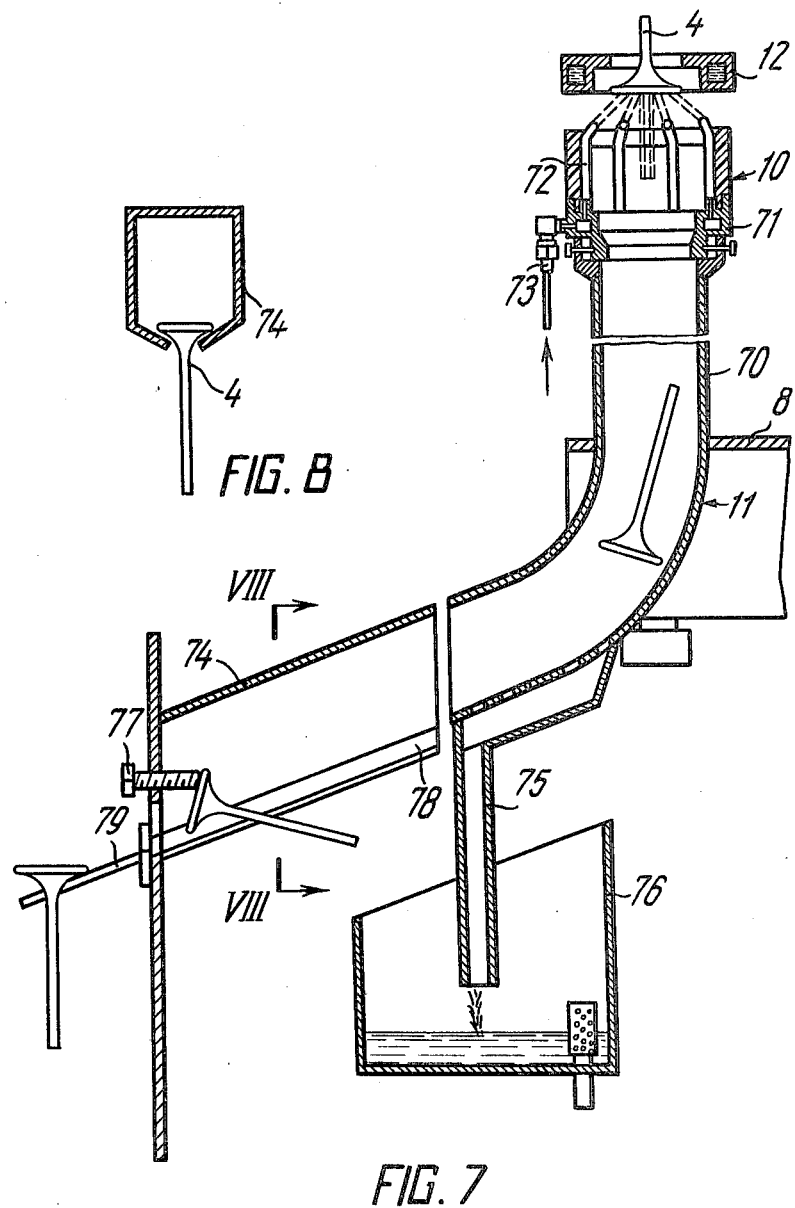
FIG. 7 is a sectional view taken along the line VII—VII in FIG. 2 showing an unloading chute.
FIG. 8 is view taken along the line VIII—VIII in FIG. 7 showing a supplementary unloading chute in cross section.

A tube 74 is attached to the wall of the unit 1 of the frame, this tube forming an extension of the unloading chute, i.e. substantially an auxiliary chute, when the sprayer is positioned under the heater, as shown in FIG. 7.

The bottom side of the tube 70 is perforated for the coolant to run off therethrough.

A pocket with a discharge tube 75 is attached to the external surface of the tube 70 in the area of perforation to collect and to evacuate the scale into a discharge tank 76.

To ensure vertical positioning of the valve 4 and travel thereof in this position, a stop such as a screw 77 is mounted in the unit 1 of the frame to serve as stop, and the bottom side of the tube is provided with a slot 78.

Guiding bars 79 attached to the unit 2 are adapted to withdraw the surfaced valve 4 from the surfacing device.

According to the invention the platform 8 is operatively connected to the manipulator 7 through a transfer gear 80 (FIG. 3). Said transfer gear 80 is formed by a toothed sector 81 which is attached to or made on the periphery of the platform 8 and is meshing with a toothed sector 31 rigidly mounted on the vertical shaft 25 of the manipulator 7.

In order to afford a clearer understanding of the apparatus for surfacing the effective areas of valves for internal combustion engines according to the invention, an automatic mode of operation thereof will be described, the facilities providing this mode of operation, which do not come within the scope of the invention, are not shown in the drawings and are not dwelt upon in the description in order to avoid the overloading of the description and difficulties in disclosing the invention.

In the following example illustrating the operation of the apparatus said facilities are called the control system.

The present apparatus for surfacing the effective areas of valves for internal combustion engines operates in the following manner.

Figure 2:
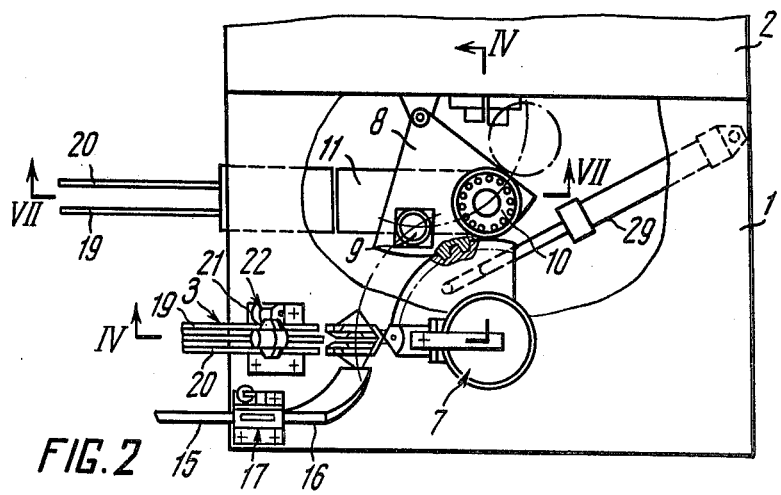
FIG. 2 is a sectional view of the apparatus taken along the line II—II in FIG. 1 with partial omission to show the rotating platform.

In the initial position, as shown in FIGS. 1, 2 and 7, the actuator 35 is in the zone of reception of the valve 4 and of the ring 6 to be fused on the valve, while the platform 8 is positioned in such a manner that the unloading chute 11 and the sprayed 10 mounted thereon are under the inductor 12. At the same time the rod 44, as a result of interaction with the stationary stop 58 (FIGS. 1 and 4), is in the position wherein the clamps 37 and 38 are brought apart at an angle $\phi_1$ (FIG. 6) which is sufficient for the stem of the valve 4 to pass between the clamps 37 and 38, and the support 39 is substantially in the horizontal position.

One valve 4 and one ring 6 are separated from a file of valves and rings moving along the guides 19 and 20 and the conveyor chute 15 by the devices 22 and 17, adapted to deliver the valves and the rings, respectively, one at a time and are advanced to the actuator 35. The valve 4, positioned stem downwards, is introduced into the gap of the clamps 37 and 38, while the ring 6, sliding on the lateral surface thereof along the sloping chute 16 and being substantially in the horizontal position, is advanced to the support 39. Now the air cylinder 29 is actuated, the rod of which, moving the carrier 28, rotates the vertical shaft 25 (FIG. 4).

The actuator 35 mounted on the horizontal shaft 32 is rotated by the vertical shaft 25 in the horizontal plane in the direction of the inductor 12, i.e. towards the surfacing zone. The vertical shaft 25 through the transfer gear 80 also sets in motion the rotating platform 8 to position the mechanism 9 under the inductor 12, said mechanism being adapted to feed the valves to the chuck 13. The horizontal shaft 32, rotating about the vertical axis, makes also one revolution around its axis due to rolling of the bevel pinion 33 about the stationary toothed sector 34. Thus, the actuator 35 performs rotary motion both in the vertical and in the horizontal planes.

At the start of the motion of the actuator 35 the rod 44, disengaging from the stationary stop 58, rises under the action of the spring 53 and carries along the shoe 45. As the shoe 45 goes upwards, the toothed rack 54 through the idle pinion 56 sets into rotary motion the toothed sector 55 of the support 39, and as a result the latter, rotating in the vertical plane, drops the ring 6 on the stem of the valve 4.

Simultaneously the casing 46, connected to the shoe 45, goes upwards and, acting with the lower surfaces of the helical grooves 47 and 48 on the rollers 49 and 50 (FIGS. 4 and 5) brings together the arms 51 and 52, which, in turn, causes the clamps 37 and 38 to close and to hold the stem of the valve 4 accommodated in the space formed by the grooves 41 and 42.

Thus, at the start of the motion of the actuator 35, at the moment when the support 39 drops the ring 6 on the stem of the valve 4, the stem is gripped by the clamps 37 and 38.

Moving from the initial position, or from the zone of reception of the valve 4 and of the ring 6, to the surfacing zone, i.e. to the zone where the feed mechanism 9 adapted to feed the valve to the heater, the sprayer 10, and the unloading chute 11 are positioned, the actuator 35 makes a revolution through 180° in the vertical plane and a revolution through 90° in the horizontal plane.

In accordance with the rotation of the actuator 35 in the horizontal plane, the rotating platform 8, having reached the end position, stops. Now the valve feed mechanism 9 adapted to feed the valve either to the heater or inductor 12 is under this inductor and under the chuck 13.

On reaching the surfacing zone the actuator 35 (FIG. 4), displaced at the angle 180°, i.e. with the rod 44 and the clamps 37 and 38 in the downward position and with the support 39 in the upward position, overrides with the end of the rod 44 the roller 60 of the movable stop 59. Interacting with the roller 60, the rod 44, counteracting the force of the spring 53, sinks a little into the housing 36 of the actuator 35. Simultaneously with this movement of the rod 44 and of the casing 46 connected to the former through the shoe 45, the surfaces of the helical grooves 47 and 48, acting on the rollers 49 and 50 of the arms 51 and 52, bring apart the clamps 37 and 38 at an angle $\phi_2$ (FIG. 6) which is sufficient to release the stem of the valve 4 but insufficient for the ring 6 gripped in the clamps 37 and 38 to fall down.

Released from the clamps 37 and 38, the valve 4, with the stem thereof still within the space formed by the grooves 41 and 42, freely sinks down and rests with the surface of its head on the pad 69 of the mechanism 9 adapted to feed the valve to the inductor 12.

At the command of the control system the fluid cylinder 62 of the movable stop 59 is actuated, and the rod 61 moving up with the roller 60 pushes the rod 44 upwards to its maximum stroke to bring apart the clamps 37 and 38 at angle $\phi_3$ (FIG. 6) sufficient for the ring 6 to pass therethrough under the action of its own weight. Besides, when the rod 44 moves the shoe 45, the toothed rack 54 through the idle pinion 56 turns upwards the support 39, thus vacating the space under the inductor 12 (FIG. 4).

Guided by the internal tapered surface of the cup 67, the ring 6 is dropped on the head of the valve 4. The assembled valve, i.e. the valve 4 with the ring 6 resting on the head thereof, is ready to be surfaced.

At the command of the control system the fluid cylinder 66 is actuated, the rising rod 68 of which when moving upwards conveys directly to the surfacing zone the valve with the ring 6 on the head thereof which are positioned on the pad 69. When the end of the stem of the valve 4 reaches the opening of the chuck 13 (FIG.

3) and, respectively, the head of the valve 4 reaches the collar of the high frequency inductor 12, the end of the stem presses a route limit switch (not shown) mounted in the opening of the chuck 13. At this time according to the control system the following commands are given: to close and to rotate the chuck 13, to energize the high frequency inductor 12, to move downwards the rod 68 with the pad 69 and thereafter to actuate the fluid cylinders 62 and 29 to withdraw the actuator 35 from the inductor 12.

The refractory alloy ring 6 melted in the high frequency current fluid is fused on the head of the valve 4 to which rotary motion is imparted in order to provide uniform distribution of the molten metal on its effective area.

As was stated hereinabove, at the command of the control system the air cylinder 29 functions, and its rod returns into the initial position. In so doing, said rod causes to move in the same direction the carrier 28 thereby ensuring the rotation of the vertical drive shaft 25 of the manipulator 7 (FIG. 4).

As a result the vertical drive shaft 25 rotates in the horizontal plane the actuator 35 mounted on the horizontal shaft 32 and returns said actuator into the initial position, i.e. into the zone of reception of the next valve and of the ring to be fused thereon, as well as sets in motion through the transfer gear 80 the rotating platform 8. Making a revolution relative to the vertical plane, the horizontal shaft 32 and the actuator 35 mounted thereon make a revolution around their horizontal axis due to interaction of the bevel pinion 33 with the stationary bevel toothed sector 34.

Similar to what has been described hereinabove, at the start of the motion of the actuator 35 the rod 44 disengages from the roller 60 of the movable stop 59 and, under the action of the released spring 53, performs the progressive motion carrying along the shoe 45.

When the shoe 45 performs the progressive motion, the toothed rack 54 acting through the idle pinion 56 on the toothed sector 55, rotates the support 39 into the previous position and the casing 46, acting with the surfaces of the helical grooves 47 and 48 on the rollers 49 and 50 of the arms 51 and 52, brings these arms together thereby causing the clamps 37 and 38 to close.

Having functioned, the fluid cylinder 29 causes the vertical drive shaft 25 to make a revolution through 90°, and this, in turn, causes the actuator 35 to make a revolution through 90° in the horizontal plane and through 180° in the vertical plane, and also causes the rotating platform 8 to rotate through an angle at which the unloading chute 11 with the sprayer 10 mounted thereon are positioned under the inductor 12 (FIG. 7).

According to the control system coolant is supplied to the sprayer 10, which coolant advancing through the tubes 72 is directed onto the head of the valve 4 to ensure directed crystallization of the deposited metal. The coolant runs off along the discharge tube 75 into the tank 76.

At the moment of its return into the initial position the actuator 35 (FIG. 4) overrides with the end of its rod the stationary stop 58, causing the clamps 37 and 38 and the support 39 to return into the initial position. The actuator 35 is ready to receive the next pair of workpieces which are presented one at a time to the actuator 35 by the devices 17 and 22, and said actuator is waiting for the end of the previous thermal cycle of surfacing of the valve 4.

When the time of the surfacing of the effective area of the valve 4 has expired, the following commands are given: to stop the supply of coolant, to release the chuck 13, to actuate the fluid cylinder 29, to drive the actuator 35 and the rotating platform 8.

When the chuck 13 is released, the surfaced valve 4 falls through the opening of the sprayer 10 into the unloading chute 11 and advances therefrom into the tube 74 of the auxiliary chute.

At the outlet end of the auxiliary chute the valve 4, hitting with its head the screw 77, is turned stem downwards and, sliding along the guides 79, leaves the apparatus (FIGS. 7 and 8).

According to the control system the actuator 35 with the next valve and ring advances to the surfacing zone. The cycle is repeated in the automatic mode.

While a preferred embodiment of the present invention has been described hereinabove, it is apparent to those skilled in the art that various changes and modifications may be made therein without departing from the true spirit and scope of the invention as defined in the appended claims.

We claim:

1. An apparatus for surfacing valves for internal combustion engines by fusing refractory alloy rings on effective areas of the valves comprising:
   a base;
   a manipulator mounted on said base and adapted to receive a valve with a ring to be fused thereon and to position said valve head downwards, said manipulator having a vertically disposed drive shaft;
   a heater mounted on said base for fusing a ring and a valve to each other;
   a valve clamping device adapted to fix the valve in the heater, said clamping device being mounted on said base over said heater;
   a rotating platform, mounted on said base and carrying a valve feed mechanism adapted to feed valves to said heater, a sprayer, and an unloading chute, said sprayer cooling a valve heated by said heater and said unloading chute being adapted to withdraw the valve from said heater;
   a transfer gear operatively connecting said rotating platform to said vertically disposed drive shaft of said manipulator for sequential positioning under said heater of said valve feed mechanism, said sprayer, and said unloading chute.

2. An apparatus according to claim 1, wherein said transfer gear comprises a toothed sector rigidly secured to said vertically disposed drive shaft of said manipulator and a toothed sector made on the periphery of said rotating platform, both sectors being in mesh with each other.

3. An apparatus according to claim 2, wherein said sprayer is a hollow annulus mounted at an inlet end of the unloading chute.

4. An apparatus according to claim 1, wherein said sprayer is a hollow annulus mounted at an inlet end of the unloading chute.

5. An apparatus for surfacing valves for internal combustion engines by fusing refractory alloy rings on effective areas of the valves comprising:
   a base;
   manipulator means mounted on said base for receiving a valve with a ring to be fused thereon and for positioning said valve head downwards, said manipulator having a vertically disposed drive shaft;

heating means mounted on said base for fusing the ring and the valve to each other;

valve clamping means mounted above said heating means for fixing the valve in said heating means;

feeding means for feeding valves to said heating means;

cooling means for cooling valves heated by said heating means;

unloading means for removing valves from said heating means;

supporting means rotatably mounted in said base for supporting said feeding means, said cooling means, and said unloading means; and gear means for operatively connecting said support means to said vertically disposed drive shaft of said manipulator means and for positioning in a predetermined sequence under said heater means said feeding means, said cooling means, and said unloading means.

* * * * *